United States Patent
Peisa et al.

(10) Patent No.: US 7,529,226 B2
(45) Date of Patent: May 5, 2009

(54) BEARER SETUP FOR A MULTIMEDIA SERVICE

(75) Inventors: Janne Peisa, Espoo (FI); Mats Sågfors, Kyrkslätt (FI); Johan Torsner, Esbo (FI); Stefan Wager, Esbo (FI)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 0 days.

(21) Appl. No.: 10/570,683

(22) PCT Filed: Aug. 24, 2004

(86) PCT No.: PCT/EP2004/051889

§ 371 (c)(1),
(2), (4) Date: Dec. 7, 2006

(87) PCT Pub. No.: WO2005/027481

PCT Pub. Date: Mar. 24, 2005

(65) Prior Publication Data

US 2007/0064676 A1 Mar. 22, 2007

(30) Foreign Application Priority Data

Sep. 12, 2003 (GB) .................................. 0321424.4

(51) Int. Cl.
*H04L 12/66* (2006.01)
*H04L 12/56* (2006.01)
(52) U.S. Cl. ...................................... 370/352; 370/401
(58) Field of Classification Search ......... 370/352–356, 370/401
See application file for complete search history.

(56) References Cited

U.S. PATENT DOCUMENTS

| 6,496,521 | B2* | 12/2002 | Dougall et al. ............... 370/524 |
| 6,683,853 | B1* | 1/2004 | Kannas et al. ............... 370/237 |
| 6,792,082 | B1 | 9/2004 | Levine |
| 7,106,718 | B2* | 9/2006 | Oyama et al. ............... 370/340 |
| 2002/0078150 | A1 | 6/2002 | Grossner et al. |
| 2002/0083462 | A1* | 6/2002 | Arnott ........................ 725/100 |
| 2002/0174199 | A1 | 11/2002 | Horvitz |
| 2004/0252674 | A1* | 12/2004 | Soininen et al. ............. 370/352 |

FOREIGN PATENT DOCUMENTS

| EP | 1 148 688 A | 10/2001 |
| WO | WO 02/063486 A | 8/2002 |
| WO | WO 03/094433 A | 11/2003 |

OTHER PUBLICATIONS

Hyong Sop Shim et al: "An example of using presence and availability in an enterprise ..." Internet Telephony Workshop 2001 ... Apr. 3, 2001, Columbia University, NY,USA.

* cited by examiner

*Primary Examiner*—Harry S Hong

(57) ABSTRACT

A method of controlling the establishment of a packet switched bearer or bearers for carrying multimedia information between two or more user terminals during a circuit switched voice call, the method comprising at setup of or during the voice call, predicting at one of the user terminals the likelihood that multimedia information will be exchanged between the user terminals during the voice call based upon properties stored at that terminal for the or each other user or user terminal, and automatically establishing said bearer or not, based upon the prediction.

17 Claims, 2 Drawing Sheets

BEARER SETUP FOR A MULTIMEDIA SERVICE

FIELD OF THE INVENTION

The present invention relates to bearer setup for a multimedia service and in particular for combinational multimedia services.

BACKGROUND TO THE INVENTION

IP Multimedia (IPMM) services provide a dynamic combination of voice, video, messaging, data, etc. within the same session. By growing the numbers of basic applications and the media which it is possible to combine, the number of services offered to the end users will grow, and the interpersonal communication experience will be enriched. This will lead to a new generation of personalised, rich multimedia communication services, including so-called "combinational IP Multimedia" services which are considered in more detail below.

IP Multimedia Subsystem (IMS) is the technology defined (in TS 32.225, Release 5) by the Third Generation Partnership Project (3GPP) to provide IP Multimedia services over 3G mobile communication networks. IMS provides key features to enrich the end-user person-to-person communication experience through the integration and interaction of services. IMS allows new rich person-to-person (client-to-client) as well as person-to-content (client-to-server) communications over an IP-based network. The IMS makes use of the Session Initiation Protocol (SIP) and Service Delivery Protocol (SDP) to set up and control calls or sessions between user terminals (or user terminals and web servers). IMS sits on top of an access network which would typically be a General Packet Radio Service (GPRS) network but which might use some alternative technology, e.g. WiFi. FIG. 1 illustrates schematically how the IMS fits into the mobile network architecture in the case of a GPRS access network. IMS will also form part of 3GPP Universal Mobile Telecommunications System (UMTS) network architectures.

An example of a combinational IP Multimedia service is a multimedia service that includes and combines both a Circuit Switched media (such as voice) and a Packet Switched media over the IP Multimedia domain (such as pictures, video, presence, instant messages, etc.). A service referred to here as "WeShare " combines the full IP Multimedia Subsystem (IMS) benefits of a multimedia service with CS voice. The service enables a user, during a Circuit Switched (CS) voice conversation with another user, to take a picture, a video or audio clip, etc. and to share this content with other users in (near) real time using the Packet Switched (PS) domain. Either party in the conversation may initiate transmission of content to the other party.

In order to convey the PS data, e.g. a picture, a Packet Data Protocol (PDP) context needs to be setup and a PS bearer (Radio Access Bearer (RAB)) established. The former is a logical association between the user terminal and the network, running across the GPRS network, which defines aspects such as routing, quality of service, etc. The latter is the physical channel resources which will actually transport the picture data. The current assumption for combinational services is that the PDP context will be setup when the CS (speech) call is established and is maintained throughout the CS call. The PS bearer needed to transmit the picture is only setup when the user wants to send a picture, and is released some time after the picture has been transmitted.

SUMMARY OF THE INVENTION

If the PS bearer is setup only when the user wants to send PS data such as a picture or video clip, the delay in establishing the PS bearer is likely to significantly prolong the time it takes to send the data. This will detract from the intended "real-time" experience for end users.

According to a first aspect of the present invention there is provided a method of controlling the establishment of a packet switched bearer or bearers for carrying multimedia information between two or more user terminals during a circuit switched call, the method comprising:

at setup of or during the circuit switched call, predicting at least one of the user terminals the likelihood that multimedia information will be exchanged between the user terminals during the circuit switched call based upon properties stored at that terminal for the or each other user or user terminal; and automatically establishing said bearer, or taking at least preliminary steps required to establish said bearer, based upon the prediction.

Preferably, said properties are stored at the predicting user terminal in a phonebook containing contact information such as names and phone numbers.

In a first embodiment of the invention, said properties comprise known multimedia capabilities for respective contacts. These capabilities define, for example, the multimedia services which a contact is able to engage in, e.g. push-to-watch. The properties may be stored at a user terminal manually, e.g. user entry, or may be stored automatically following some earlier communication with the relevant contact including a capability negotiation procedure.

In a second embodiment of the invention, the properties are based upon call history. For example, a new contact entered into the phonebook may be set by default as capable or incapable of engaging in a particular service. In the former case, the default property may be changed following a CS call (or a predefined number of calls) during which no multimedia information is exchanged. Similarly, if the latter case, the default setting may be changed following a CS call during which multimedia information is exchanged Typically, a user may always manually establish a multimedia bearer during a CS in the event that the properties for the peer user do not cause the bearer to be established automatically on CS call setup.

According to a second aspect of the present invention there is provided a method of operating a user terminal to control the establishment of a packet switched bearer or bearers for carrying multimedia information between the user terminal and one or more other user terminals during a circuit switched call, the method comprising:

at setup of or during the circuit switched call, predicting the likelihood that multimedia information will be exchanged between the user terminals during the circuit switched call based upon properties stored at that terminal for the or each other user or user terminal; and initiating establishment of said bearer, or taking at least preliminary steps required to establish said bearer, based upon the prediction.

According to a third aspect of the present invention there is provided a method of controlling the establishment of packet switched bearers for carrying multimedia information between two or more user terminals during a circuit switched call, the method comprising:

establishing a bearer or bearers automatically, or taking at least preliminary steps required to establish said bearer(s), in response to the creation or selection, or an initial step in the creation or selection, by a user of multimedia information suitable for sending between the terminals over a packet switched bearer.

In one embodiment of this third aspect of the invention, said bearer is established in response to a user taking a photograph with an in-built camera of the user terminal or with a camera coupled to the terminal.

According to a fourth aspect of the present invention there is provided a method of operating a user terminal to control the establishment of a packet switched bearer or bearers for carrying multimedia information between the user terminal and one or more other user terminals during a circuit switched call, the method comprising:

Initiating establishment of a bearer or bearers, or taking at least preliminary steps required to establish said bearer(s), automatically in response to the creation or selection, or an initial step in the creation or selection, by a user of multimedia information suitable for sending between the terminals over a packet switched bearer.

DETAILED DESCRIPTION OF CERTAIN EMBODIMENTS

The concept of the combinational multimedia service, combining circuit switched and packet switched domains, has been introduced above. In order to provide enhanced user experience, it is desirable to reduce the time delay in transmitting PS data such as a picture or video clip between users. At the same time however, the consumption of unnecessary network resources should be minimised. Both of these aims can be satisfied by enabling user terminals to predict when a user is likely to want to take advantage of a combinational service.

Considering by way of example the 3GPP Universal Mobile Telecommunication System (UMTS), establishment of a packet switched bearer suitable for carrying multimedia Information consists of a number of discrete steps which must be carried out in sequence. These are:
1. Signalling connection establishment and authentication.
2. PDP context establishment.
3. RAB configuration. This could involve configuring RLC and MAC protocols
4. Resource reservation at some level.

The present invention proposes carrying out one or more of these steps automatically in a predictive manner. Of course, the invention is applicable to other communications services such as CDMA2000 which will have their own bearer service definitions.

EXAMPLE 1

An application in the User Equipment (UE) can be used to predict the user behaviour and request a PS RAB (and potentially also a PDP context—if this has not already been established) when the user takes a picture/video clip during a speech call, since the likelihood that the user will subsequently transmit the picture/clip during the call Is high. The setup time from the sending of the request to the network Is likely to be of the order of 3-5 seconds. It is likely to take a similar time, or longer, before the user actually initiates the sending of the picture/clip and starts to discuss it with the other party. The resource reservation occurs only at the time that the user chooses to send the multimedia data. As far as the users are concerned, the transfer will occur in substantially real-time.

Figure 1:
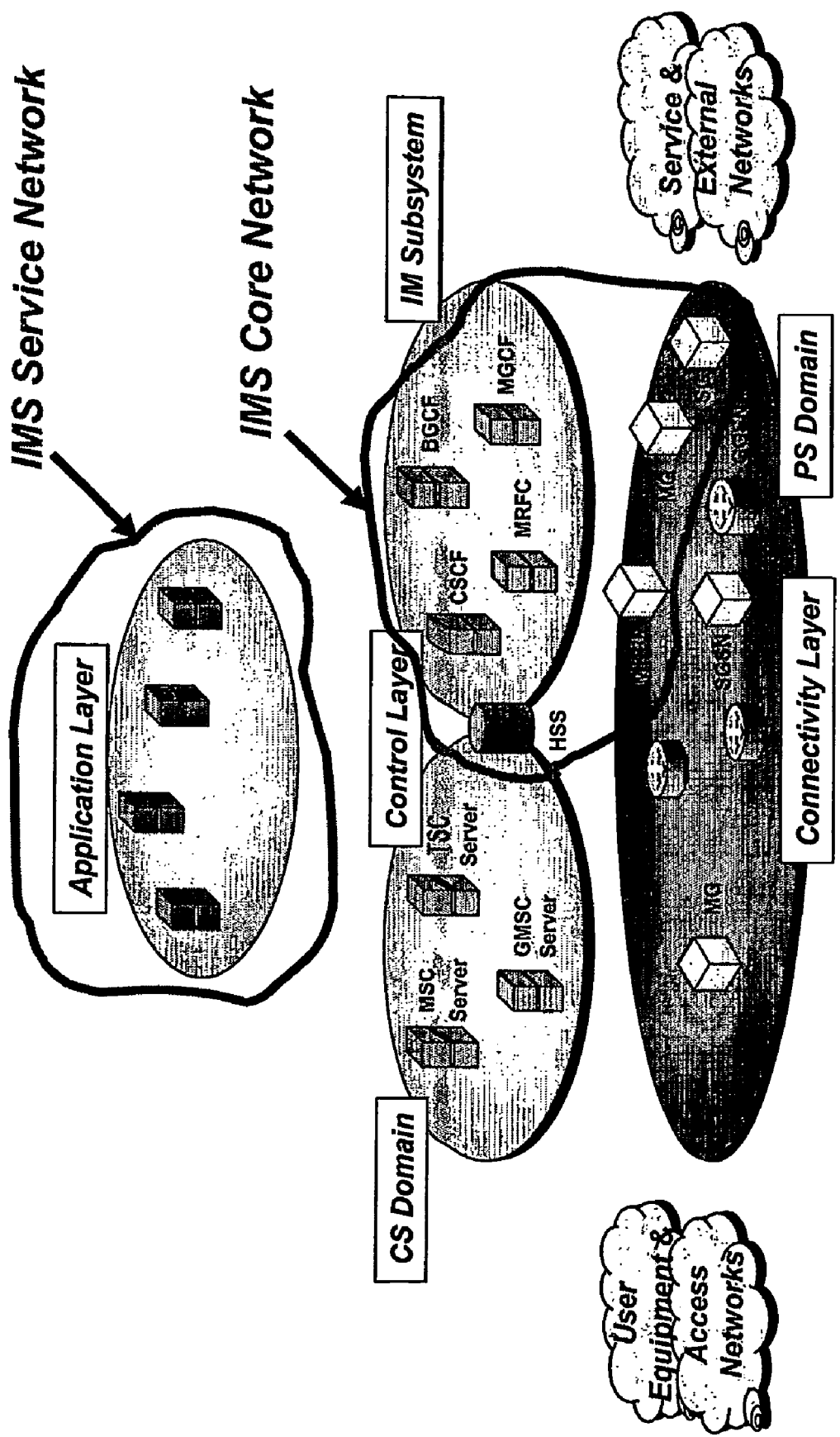
FIG. 1 illustrates schematically the IMS architecture within a communications network architecture.
Figure 2:
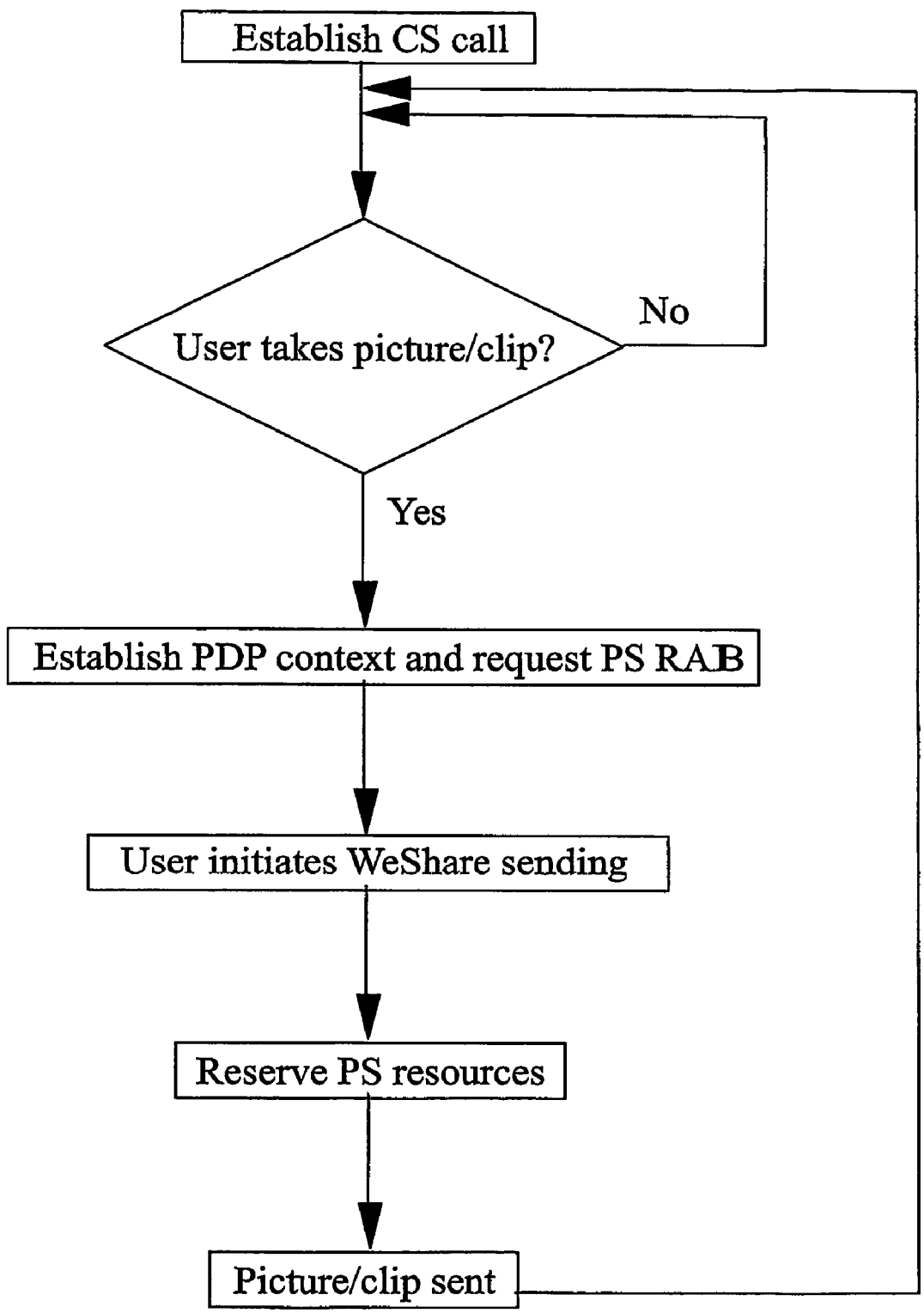
FIG. 2 is a flow diagram illustrating a preferred embodiment of the invention.

The flow diagram of FIG. 2 illustrates the main steps of this embodiment of the invention.

EXAMPLE 2

It can be expected that a user normally only sends pictures or video clips to a fraction of the contacts in his/her terminal's "phonebook". Either the contact has a terminal/subscription that does not support the particular combinational service or the contact is of such nature that pictures/clips are normally not sent to ft. It would be expensive (from the operator's point of view) to always setup a PS RAB and/or PDP context following establishment of a voice call between the user and these contacts given that there is no likelihood, or very little likelihood, that the combinational service will be used.

Information can be stored in a terminal's phonebook on the history of transmitting pictures/video clips to a contact and/or the capabilities of the contacts to engage in a combinational service. Only for those contacts to which a picture/video clip has been sent before (or for which the user has manually sets the property) and/or which are able to engage in the combinational service, are PS RABs (and potentially PDP contexts if not already established) established automatically at CS call setup. Otherwise the resources are established only when needed. Again, resource reservation may occur at the time that the user chooses to send the multimedia data.

The advantages of this approach vis-à-vis the conventional approaches are a reduced delay for transmitting pictures to contacts to which pictures are normally transmitted, or alternatively a saving of resources given that there is no longer a need to establish packet switched bearers (and contexts) when establishing speech calls to users than do not support the combinational service or are of such nature that pictures are normally not sent to them.

EXAMPLE 3

User terminals can be equipped with a "WeShare" button (hard or soft key) which is used to request a PS RAB (and potentially setup a PDP context) in parallel with the CS speech bearer. The button could also be used during a call, in which case the result may be both to activate an in-built or connected camera and to establish the PS RAB.

It will be appreciated by those of skill in the art that various modifications may be made to the above described embodiments without departing from the scope of the present invention. For example, by combining two or more of the procedures described in the above examples, greater savings In network resources may be achieved.

The invention claimed is:

1. A method of controlling the establishment of a packet switched bearer or bearers for carrying multimedia information between two or more user terminals during a circuit switched call, the method comprising:

at setup of or during the circuit switched call, predicting at at least one of the user terminals the likelihood that multimedia information will be exchanged between the user terminals during the circuit switched call based upon properties stored at that terminal for the or each other user or user terminal; and automatically establishing said bearer or not or taking at least preliminary steps required to establish said bearer, based upon the prediction.

2. A method according to claim 1, wherein said properties are stored at the terminal in or associated with a phonebook containing contact information such as names and phone numbers.

3. A method according to claim 2, wherein said properties comprise known multimedia capabilities for respective contacts.

4. A method according to claim 2, wherein the properties are based upon call history to contacts.

5. A method of operating a user terminal to control the establishment of a packet switched bearer or bearers for carrying multimedia information between the user terminal and one or more other user terminals during a circuit switched call, the method comprising:
   at setup of or during the circuit switched call, predicting the likelihood that multimedia information will be exchanged between the user terminals during the circuit switched call based upon properties stored at that terminal for the or each other user or user terminal; and
   initiating establishment of said bearer, or taking at least preliminary steps required to establish said bearer, based upon the prediction.

6. A method of controlling the establishment of bearers for carrying multimedia information between two or more user terminals during a circuit switched call, the method comprising:
   establishing a bearer or bearers automatically, or taking at least preliminary steps required to establish said bearer(s), in response to the creation or selection, or an initial step in the creation or selection, by a user of multimedia information suitable for sending between the terminals.

7. A method according to claim 6, wherein said bearer or bearers is/are established, or at least preliminary steps required to establish said bearer are taken, in response to a user taking a photograph or video-clip with an in-built camera of the user terminal or with a camera coupled to the terminal, or in response to activation of such a camera.

8. A method of operating a user terminal to control the establishment of a packet switched bearer or bearers for carrying multimedia information between the user terminal and one or more other user terminals during a circuit switched call, the method comprising:
   initiating establishment of a bearer or bearers automatically, or taking at least preliminary steps required to establish said bearer, in response to the creation or selection, or an initial step in the creation or selection, by a user of multimedia information suitable for sending between the terminals over a packet switched bearer.

9. A method according to claim 1, wherein the or each said packet switched bearer is a packet switched bearer in a WCDMA, CDMA2000, or GSM/GPRS system.

10. A method according to claim 1, wherein said preliminary steps required to establish said bearer include at least one of:
    signalling connection establishment and authentication;
    establishing a Packet Data Protocol context for a bearer; and
    Radio Access Bearer configuration.

11. A method according to claim 10 and comprising reserving transmission resources subsequent to completing said preliminary steps.

12. A method according to claim 5, wherein the or each said packet switched bearer is a packet switched bearer in a WCDMA, CDMA2000, or GSM/GPRS system.

13. A method according to claim 6, wherein the or each said packet switched bearer is a packet switched bearer in a WCDMA, CDMA2000, or GSM/GPRS system.

14. A method according to claim 8, wherein the or each said packet switched bearer is a packet switched bearer in a WCDMA, CDMA2000, or GSM/GPRS system.

15. A method according to claim 5, wherein said preliminary steps required to establish said bearer include at least one of:
    signalling connection establishment and authentication;
    establishing a Packet Data Protocol context for a bearer; and
    Radio Access Bearer configuration.

16. A method according to claim 6, wherein said preliminary steps required to establish said bearer include at least one of:
    signalling connection establishment and authentication;
    establishing a Packet Data Protocol context for a bearer; and
    Radio Access Bearer configuration.

17. A method according to claim 8, wherein said preliminary steps required to establish said bearer include at least one of:
    signalling connection establishment and authentication;
    establishing a Packet Data Protocol context for a bearer; and
    Radio Access Bearer configuration.

* * * * *